Feb. 15, 1949.  H. J. HARKER  2,462,021
EXTRACTING DEVICE FOR BAKERY PRODUCTS
Filed Jan. 9, 1947  5 Sheets-Sheet 1
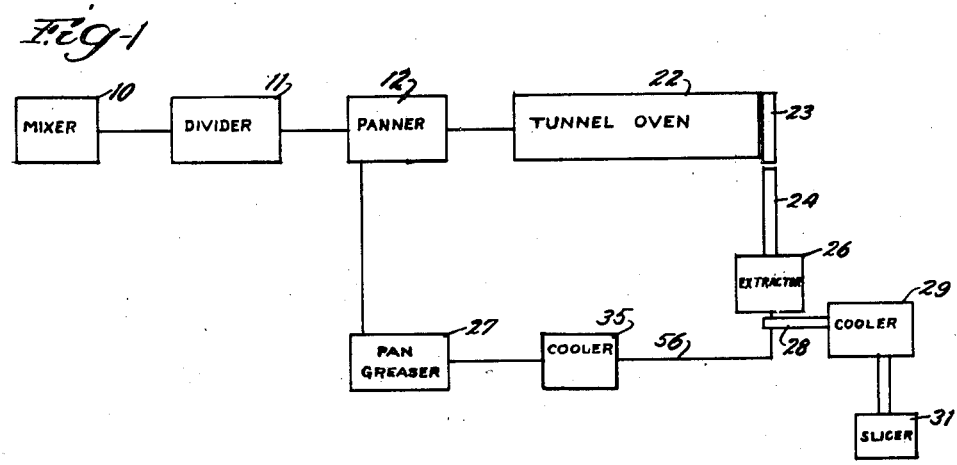
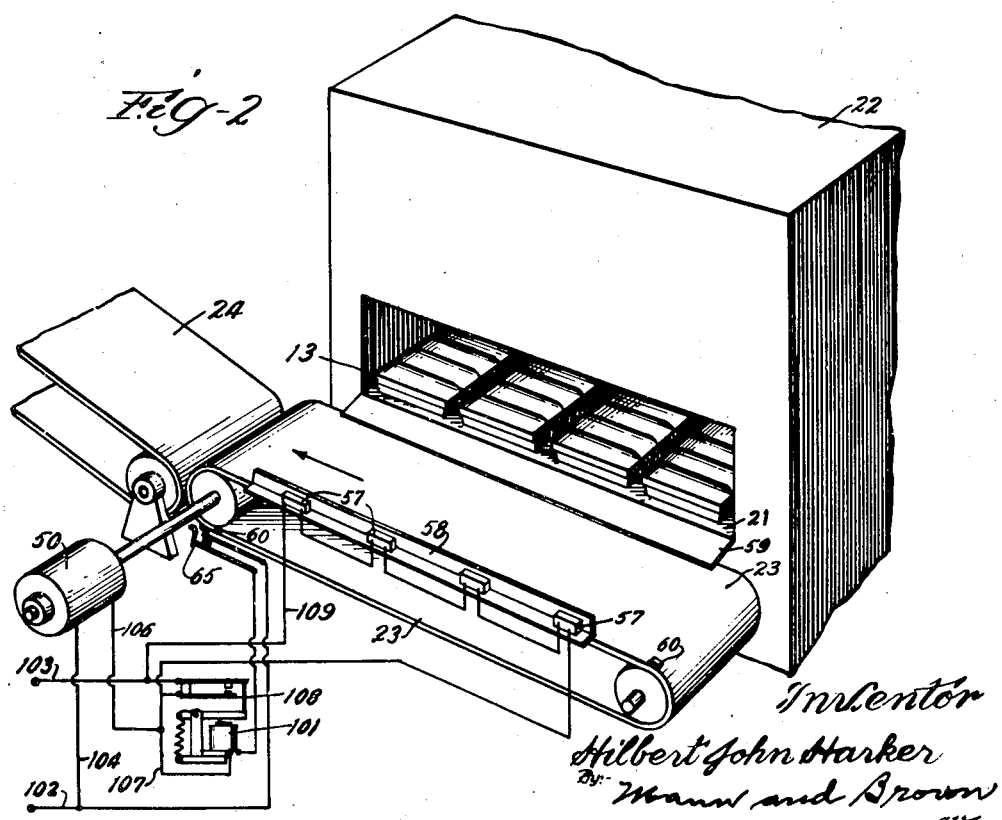

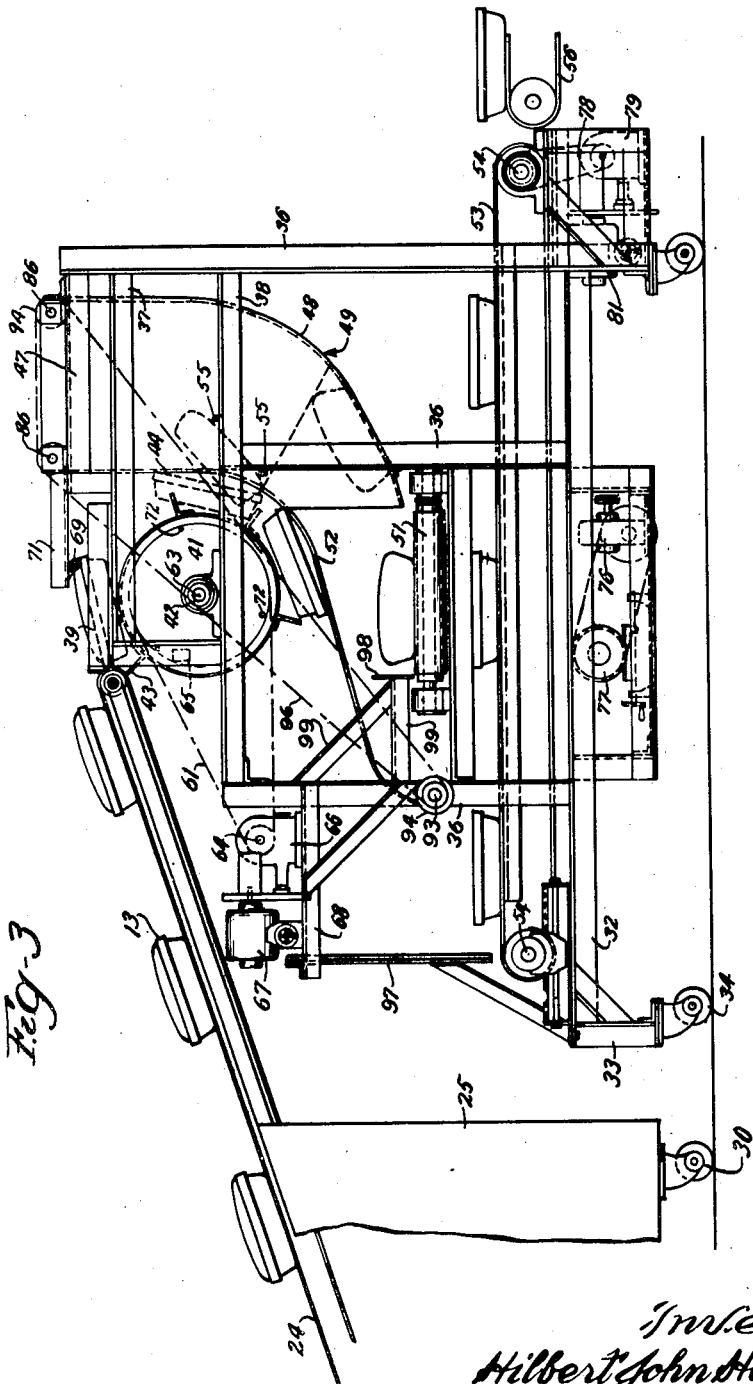

Feb. 15, 1949. H. J. HARKER 2,462,021
EXTRACTING DEVICE FOR BAKERY PRODUCTS
Filed Jan. 9, 1947 5 Sheets-Sheet 3
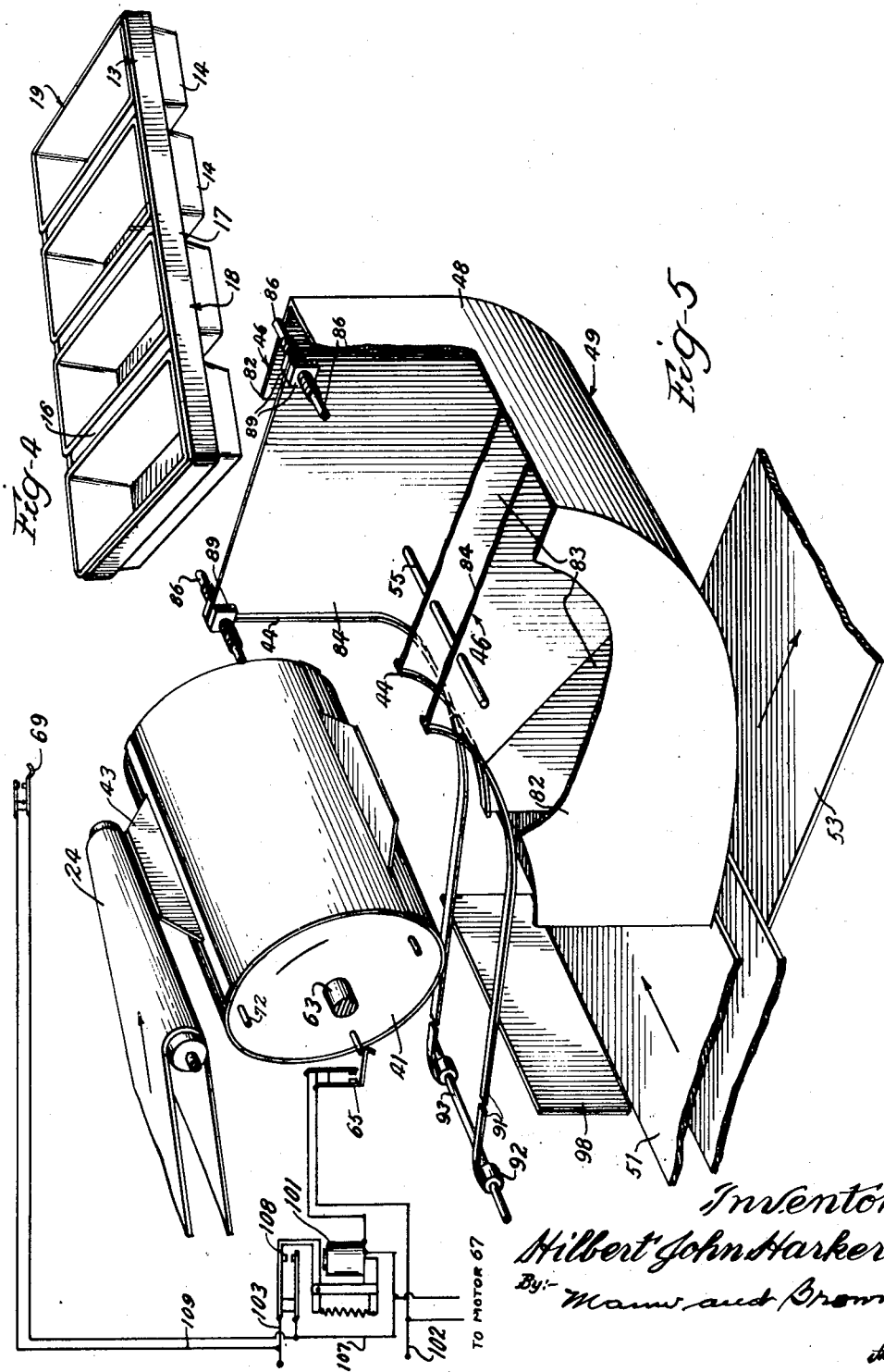

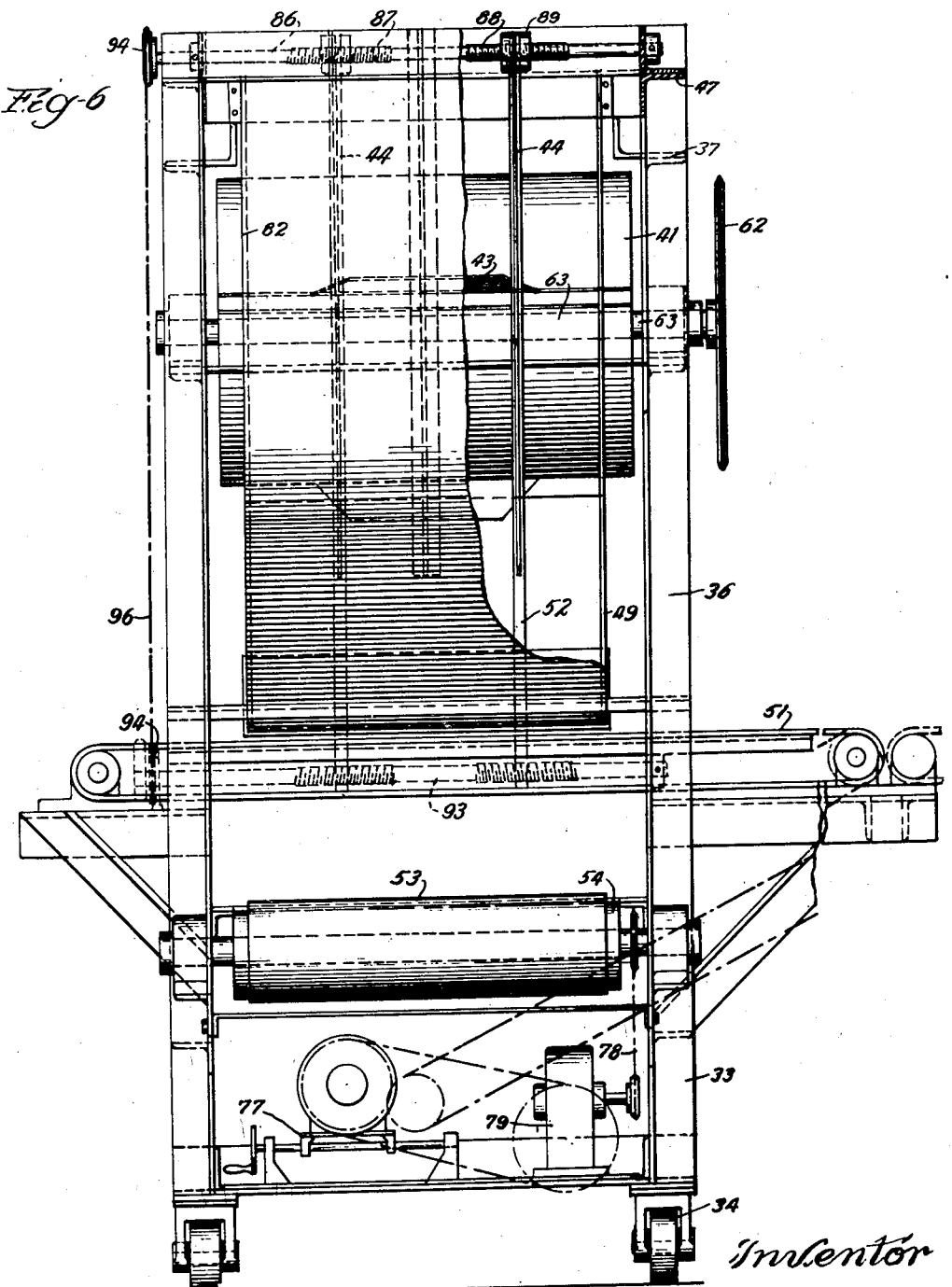

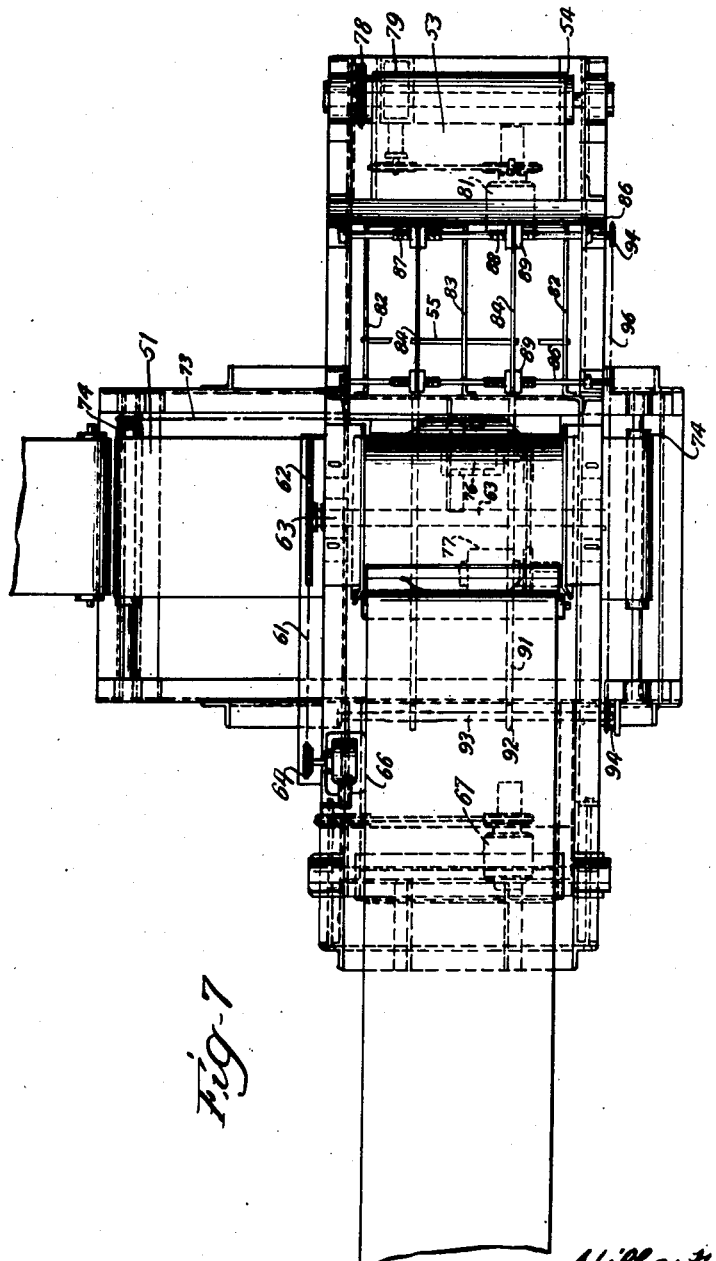

Patented Feb. 15, 1949

2,462,021

UNITED STATES PATENT OFFICE 2,462,021

EXTRACTING DEVICE FOR BAKERY PRODUCTS

Hilbert John Harker, Detroit, Mich., assignor to Purity Bakeries Service Corporation, a corporation of Illinois Application January 9, 1947, Serial No. 721,008

4 Claims. (Cl. 214—1.1)

My invention is directed to automatically operating bakery equipment and is specifically concerned with the provision of a device for automatically extracting bakery products from baking containers.

Bakery goods, such as bread, are preferably removed from baking containers as soon as possible after emergence from the baking oven in order to reduce the possibility of sticking of the goods to the container. One or more men are therefore usually stationed at or near the discharge end of the oven to perform this operation which is accomplished by grasping the containers, partially inverting them and, while partially inverted, striking an edge of the container sharply against a stationary object to loosen the contents. Since this work is preferably performed near the oven, the ambient temperature is high and the containers, as well as the contents, are quite hot. Furthermore, several containers are usually permanently secured together into pan sets, the assembly without contents often weighing over ten pounds. As a result, it may be seen that the work is tiring and arduous, experience indicating that even experienced men require frequent relief from this work.

An important object of my invention is to provide a device which will automatically remove bakery products, and the like, from the baking containers in a rapid and economical manner.

Other objects include the provision of such a device which may be economically operated, which will handle containers of various sizes and shapes, and which will discharge both containers and contents in proper position for further processing, thus eliminating a substantial amount of disagreeable, manual labor.

Briefly, I accomplish this and other objectives by conveying filled containers, usually pan sets, to the top of my machine, herein termed an extractor. The pan sets fall from the conveyor to the surface of a rotatable drum having a series of flights or impact members disposed at intervals on its surface parallel to its axis. The extractor is adjusted relative to the conveyor until the center of gravity of the falling pan set lies between the crest of the drum and the end of the conveyor so that upon striking the surface of the drum the pan set tilts to the rear. The pan set in falling closes a switch which starts a motor connected to the drum thus causing the impact member immediately to the rear of the pan set to push the pan set over the crest of the drum and allowing it to fall or slide into edgewise contact with the impact member immediately preceding the pan set. The speed of rotation of the drum is such that this impact occurs while the pan is approaching or slightly past a vertical position and in close proximity with a set of deflector bars which are spaced to permit passage of the container's contents but not the container. The upper edge of the pan set falls over against the deflector bars into a partially inverted position thus allowing the contents to fall through the bars into suitable chutes leading to a conveyor. In falling, the loaves of bread or other bakery goods strike an inverted bar which causes the loaves to strike the chute bottom side down. Meanwhile the drum has continued its movement, the impact member in front of the now empty pan set gradually lifting from the path of the pan set, which slides down the second chute into a suitable conveyor, reversing its position as it falls from the chute to the conveyor.

For a more complete description of my device and its operation, reference is made to the following specification and to the drawings in which Figure 1 is a diagrammatic illustration of a flow sheet of a modern bakery;

Figure 2 is a diagrammatic, partial perspective view of the discharge end of a bakery oven;

Figure 3 is a partial diagrammatic side view of my extractor;

Figure 4 is a perspective view of a pan set;

Figure 5 is a partial perspective view of a portion of my extractor;

Figure 6 is a partially sectioned end view of my extractor; and

Figure 7 is a top view of my extractor.

General organization

Since bread constitutes probably the most important single article produced by bakeries, the following description will be confined principally to a bread-extracting machine with the knowledge that in view of my disclosure those skilled in the art can readily modify my extractor to operate properly with other similar products without departing from the true spirit and scope of this invention.

As may be seen in Figure 1, flour, water and other ingredients are added to a mixer 10 which forms the dough. From the mixer 10 the dough is transferred to a divider 11 where it is cut into segments and delivered to a panner 12. At this point the dough segments are placed in baking containers 13 and delivered to a tunnel oven 22 which houses a conveyor 21. The baking containers 13 customarily employed for this operation are termed "pan sets" since they comprise a series of pans 14, illustrated in Figure 4, jointed together into sets suitably containing four pans or containers. Spacers 16 are provided between the pans, which are ordinarily tapered, to secure a rigid structure and a band 17 is secured around edges 18 and ends 19 of the assembly, forming a rigid structure. These pan sets are placed in edge-to-edge relationship on the oven conveyor 21 and emerge at the far or discharge end. Extraction is normally performed within a reasonable distance of the discharge end of the oven by one or more men, but in lieu thereof I provide a conveyor 23, which receives the pan sets falling from the oven and transfers them to a conveyor 24 leading to an extractor or depanning station 26. In the extractor, as subsequently described, the pan set is separated from its contents, the contents being led by a conveyor, indicated at 28, to a cooler 29, or the like, and subsequently to a slicer and wrapper 31. The empty pan sets 13 from the extractor 26 are led by a conveyor 56 to a cooler 35, or the like, and then to a pan greaser 27 from which point they are again delivered to the panner 12 to receive a fresh charge of dough segments.

It is understood, of course, that the above described sequence of operation and machinery is highly condensed, and many items of equipment often found in bakeries have been purposely omitted from the drawings and specification as unnecessary to a description of my extractor and its relationship to associated machines.

The extractor 26 is fed by a variable speed conveyor 24 which delivers filled pan sets 13, separated by a predetermined minimum spacing, to my device. The extractor 26, in general, comprises a bed 32 having legs 33 mounted on casters 34. A plurality of uprights 36 extends upwardly from the bed 32 and is connected by upper and lower horizontal connecting members 37 and 38, respectively. The upper horizontal connecting member 37 is provided with a pair of guide plates 39 which may be adjustably secured thereto, if desired, adapted to receive pan sets 13 delivered by the conveyor 24 and guide them into proper position to drop onto the surface of a drum 41 disposed immediately below the guides. The drum 41 is journalled in pillow blocks 42 secured to the lower horizontal connecting members 38 and is provided with a series of axially disposed flights or impact members 43 on its surface. A plurality of deflector or knock-out bars 44 which are secured to partitions generally designated 46, some of which are adjustable, are mounted a short distance laterally from the surface of the drum 41, the distance between the surface of the drum and the deflector bars 44 being greater than the depth of a pan set 13. The drum 41 acts as a conveyor to move the pans into contact with knock-out bars 44 with the side of the drum 41 adjacent the knock-out bars 44 being a downwardly curved section of the drum conveyor. The rear edges of the partitions 46 are in contact with a curved plate 48 which curves downwardly and inwardly below the drum 41 forming an inclined bread chute, generally designated 49. A bread conveyor 51 extends transversely between uprights 36 immediately below the discharge end of the bread chute 49. A pan chute 52 is, in effect, a continuation of two or more of the deflector bars 44 and curves inwardly below the drum 41 above the bread chute 49 and the bread conveyor 51. A pan conveyor 53 having end rollers 54 secured to the bed 32 extends longitudinally through the extractor immediately below the bread conveyor 51 and delivers empty pan sets to a conveyor 56 which leads to the pan greaser 27. An inverter bar 55 is disposed transversely through the partitions 46 to intercept the contents of the pan sets during their fall from the pans into the bread chute 49 to insure that the contents will fall into the chute bottom side down. The inverter bar 55 may alternatively be disposed in front of the partitions 46, as indicated by dotted lines in Figure 3, and means may be provided for adjustment of position. In either arrangement the inverter bar is positioned transversely of the line of the movement of the pans over drum 41. Either the extractor 26 or the extractor conveyor 24, or both, are movable, the extractor conveyor 24 being provided with legs 25 mounted on casters 30 for this purpose. This movability is necessary to permit adjustment of the distance between the end of the conveyor 24 and the crest of drum 41.

Construction

To maintain at least the minimum desired spacing between pan sets 13, the conveyor 23 at the discharge end of the oven 22 is normally maintained motionless and is driven by a motor 50 controlled by a plurality of normally open series-connected switches 57 mounted on a stop board 58 which is disposed along the upper run of the conveyor 23 on a side opposite the discharge end of the oven 22. An apron 59 extends from the oven conveyor 21 downwardly to the conveyor 23. The pan sets moved by the oven conveyor 21 slide down the apron 56 onto the motionless conveyor 23, striking the switches 57 and the stop board 58. Each pan set 13, striking the stop board 58, closes one of the switches 57 which are connected in series, the conveyor 23 remaining motionless until all of the switches 57 are closed, completing the circuit to motor 50. It is of course necessary that the number of switches 57 be equal to the number of rows of pan sets on the oven conveyor 21, and that the conveyor 23 operate for a sufficient length of time to deliver all pan sets in one row to the conveyor 24, subsequently stopping to receive the pan sets in the next succeeding row.

Various means may be employed to obtain this sequence of operation. For example, cams 60 may be secured to the conveyor belt to trip a normally closed switch 65 connected in series between the coil of a relay 101 and one of a pair of wires 102, 103 connected to a suitable source of electric current. A lead 104 from the motor 50 is connected to wire 102, and a second lead 106 to a wire 107 which is connected to switches 57, the coil of relay 101, and to one of the normally open contacts 108 of the relay 101. A wire 109 completes the circuit from switches 57 to wire 103. Closing switches 57 completes a circuit through wires 102, switch 65, the coil of relay 101, wire 107, switches 57, wire 109, and wire 103, thus energizing the motor 50 and closing contacts 108. Contacts 108, when closed, connect wire 107 to wire 103 and are held closed until cam 60 trips switch 65, thus breaking the circuit to relay 101. The conveyor 23 moves at a relatively slow speed but is faster than the oven conveyor 21 so that all pan sets deposited on the conveyor will be discharged before any portion of the next row of pan sets 13 in the oven 22 falls to the conveyor 23. The conveyor 24, however, is substantially more rapid in movement than the conveyor 23, thus it may be seen that as the pan sets fall from the conveyor 23 to the conveyor 24 a predetermined minimum spacing is established.

A chain 61 engages a sprocket 62 secured to shaft 63 of the drum 41 and also engages a sprocket 64 secured to the output shaft of a speed reducer 66 which is driven by a motor 67. The motor 67 and speed reducer 66 are mounted on a shelf 68 secured to the uprights 36 on the left of the extractor as seen in Figure 3. The motor 67 is controlled in part by a switch 69 secured to an arm 71 extending outwardly from a superstructure 47 disposed immediately above the upper horizontal connecting member 37. The circuit to the motor 67 is substantially identical to the circuit to motor 50 previously described, similar numerals indicating similar connections. In this instance, however, the normally open switch 69 is substituted in the circuit for the series-connected switches 57 and the switch 65 is secured to an upright 36, or other suitable frame member, in position to be tripped by cams 72 secured to an end of the drum 41, the number of cams 72 employed and the spacing between cams being equal to the number and spacing of the impact members 43. Usually three equally spaced impact members 43 and cams 72 will be sufficient, the circuit then operating to rotate the drum 41 through 120° each time the switch 69 is closed. The speed reducer 76 and the motor 77 are conveniently mounted below the bed 32. The pan conveyor 53 is driven by a chain or belt 78 extending over conveyor rollers 54 and engaging the output shaft of a speed reducer 79 driven by a motor 81 disposed immediately below the bed 32 at the right end of the extractor as seen in Figure 3.

As previously mentioned, the bread chute 49 is divided by a series of partitions generally designated 46. Ordinarily I prefer to provide fixed end partitions 82 and a fixed centrally disposed partition 83. Movable partitions 84 are disposed between the center partition 83 and each of the end partitions 82. The deflector bars 44 are secured to the ends of the partitions adjacent the drum 41, those secured to the movable partitions 84 having extension strips 91 extending below the drum 41 and forming the pan chute 52. Spaced parallel threaded shafts 86 are journalled to the superstructure 47 and provided with left-hand threads 87 on one end and with right-hand threads 88 on the other end. Nuts 89 are mounted on each of the threaded portions of the shafts 86 and are secured to the ends of the movable partitions 84. The strips 91 extend laterally over and above the bread conveyor 51 and are secured to nuts 92 mounted on a shaft 93 which is journalled to the uprights 36. The shaft 93 is threaded in a manner similar to that described in connection with the shafts 86. Both the shafts 86 and 93 are provided with sprockets 94 secured to the ends thereof and are interconnected by a chain 96 extending over said sprockets 94 in such manner that as the chain is moved, all sprockets will be moved simultaneously thereby permitting simultaneous adjustment of the movable partitions 84 and the strips 91. The inverter bar 55 extends through the partitions 82 and 83 and 84 spaced inwardly a predetermined distance from the deflector bars 44 and parallel to the axis of the drum 41. For maximum flexibility the position of the inverter bar 55 may be made adjustable by adjustably securing the bar to the lower horizontal connecting members 38 and by providing slots in the partitions to permit lateral adjustment thereof. However, in the bakeries producing only bread in its various forms, it has been found that adjustment of the inverter bar 55 is unnecessary and it is therefore illustrated as mounted in a fixed position. A stop plate 97 is secured to the shelf 68 directly in front of the discharge end of the pan chute 52 which is disposed some distance above the pan conveyor 53 and is adapted to intercept pans leaving the chute with too great a velocity. A similar stop plate 98 may be secured by arms 99 to uprights 36 in front of the discharge end of the bread chute 49 and on the opposite side of the bread conveyor 51. However, when the slope of the bread chute 49 and the pan chute 52 is proper, neither of the stop plates 98 or 97 will be necessary.

*Operation*

To describe the operation of my device, reference is again made to Figure 2 which illustrates the discharge end of the oven 22. Pan sets 13 containing the baked bread dough have been passed through the oven 22 which may, for example, be approximately 60 feet long and require approximately 15 to 35 minutes to bake the average loaf of bread. The pan sets 13, which with their contents may weigh up to 16 pounds apiece, emerge from the oven 22 at temperatures of approximately 350° to 400° F., sliding usually one by one down the apron 59 onto the motionless conveyor 23 whereupon the switches 57 are closed causing the conveyor 23 to deliver the pan sets to the extractor conveyor 24. The pan sets are disposed with their edges 18 extending transversely across the extractor conveyor 24 and are so conveyed to the top of the extractor 26 whereupon they fall forwardly, the guides 39 engaging the ends 19 of the pan sets to insure their fall upon the surface of the drum 41 in proper position. In falling, the switch 69 engages a spacer 16 on the pan sets 13 causing the drum 41 to rotate. The position of the extractor 26 relative to the conveyor 24 is adjusted in such manner that the center of gravity of the falling pan set will lie between the crest of the drum 41 and the end of the conveyor 24, thus insuring that the pan set 13 upon striking the drum 41 will tilt to the rear (counter clockwise) and be engaged by an impact member 43. This impact member 43 pushes the pan set 13 with its contents over the crest of the drum 41 and in a clockwise direction (Figure 3) until the pan set falls downwardly into edgewise contact with the preceding impact member 43, the position at this instant being illustrated in dotted lines in Figure 3. Since the space between the deflector bars 44 and the surface of the drum 41 is somewhat greater than the depth of the pan set, it is obvious that the trailing edge of the pan set will fall forwardly into contact with the deflector bars 44, partially inverting the pan set as indicated in dotted lines in Figure 3. It should be noted that the deflector bars 44 are disposed to contact only the spacers 16, the bread or other container contents being untouched by the extractor up to this point. Contact between the spacers 16 and the deflector bars 44 is insured by proper adjustment of the movable partitions by means of the chain 96. The impact of the filled pan set 13 on the impact member 43 immediately preceding the pan set as well as the impact with the deflector bars 44 jars the bread or other contents loose in the container permitting the contents to fall forwardly and outwardly through the deflector bars 44 into the bread chute 49. In falling, the bread or other contents pivot about their lower ends and, if allowed to fall freely, would perhaps fall bottom side up into the chute 49. This is prevented, however, by the inverter bar 55 which is positioned to intercept either the upper or lower end of the loaf, depending on the shape of the loaf and the distance to the chute 49, thus causing an inversion of the loaf in falling and insuring that the bread will land on bread chute 49 right side up. The bread continues down the chute 49 by gravity, falling therefrom to the bread conveyor 51 which delivers it to the conveyor 28 from which it is conveyed to the cooler 29.

During the extraction of the bread from the container the drum 41 continues to rotate, thus permitting the now inverted empty pan set to slide along the strips 91 until the impact member 43 immediately preceding the pan set is lifted from its path, allowing the pan set to slide freely down the strips 91. At the end of the pan chute 52 the leading edge of the empty pan set drops downwardly, striking the pan conveyor 53 which is moving in a direction opposite to the direction of travel of the pan set in the pan chute 52, thus causing an inversion of the pan set during its fall. The pan sets 13 therefore fall on the conveyor 53 bottom side down and are delivered by conveyor 53 to the conveyor 56 and thence to the pan greaser 27. Other pan sets with their contents go through the same cycle, each being separated from the preceding pan set by one of the impact members 43.

It should be understood, of course, that changes in the size, shape or weight of the pan sets may require some adjustment of the extractor. For example, if longer loaves of bread are being baked, the distance from the crest of the drum 41 to the end of the conveyor 24 must be adjusted in a manner heretofore described. The speed of the drum may also require adjustment by means of the speed reducer 66 and the position of the deflector bars 44 may be adjusted by movement of the chain 96 to properly engage the spacers 16 of the new pan set. The guides 39 may be adjusted if necessary to engage the ends of the pan sets and the speed of the conveyor 24 properly adjusted in relation to the speed of the conveyor 23 and the speed of the drum 41 to insure proper delivery of the filled pan sets 13 at the desired intervals. If the shape of the product being baked differs radically from that previously processed, it may be necessary to adjust the position of the inverter bar 55 to insure delivery of the contents of the containers right side up in the chute 49. However, adjustments of this order are normally not extensive in nature and will be made only infrequently during the use of my device.

It must also be understood that the difficulty of extraction varies with the type of bread, the shape of the loaf, the type and amount of grease on the pan set as well as for other similar reasons, and that in many cases no impact or jarring of the pan set is necessary to extract the bread.

It is considered that a container is "inverted" when it is turned beyond the position in which the top face thereof is in a vertical plane. The term "partially inverted" is to differentiate between the situation when the container is "wholly inverted," i. e., when the container is turned with the top side downwards in a horizontal plane, but in no instance is the container considered to be even at least partially inverted until the top side has passed the vertical position.

From the foregoing, it should not be understood that I wish to limit myself specifically to the details herein described since obviously many changes may be made therein without departing from the true spirit and scope of my invention. I therefore desire to limit myself only to the extent defined in the appended claims.

I claim:

1. In a depanning device for removing loaves of bread or the like from open-topped pans in which they are baked, the combination of conveyor means for conveying a pan of bread to a depanning station, said conveyor means including a downwardly curved section adjacent to the depanning station for at least partially inverting the pan, a lug movable with the conveyor means about the periphery of said curved section for supporting the pan during at least a part of said inverting movement, means adapted to receive and engage a top portion of the pan during the inverting movement to arrest the pan and jar the bread from the pan, said arresting means permitting the bread to fall by gravity and momentum from the pan, an inclined chute adapted to receive the bread as it falls from the pan, and bread re-inverting means interposed between the arresting means and said chute and adapted to intercept the bread as it falls from the pan, turn it about an axis transverse to the conveyor means, and drop it on said inclined chute in righted position.

2. In a depanning device for removing loaves of bread or the like from open-topped pans in which they are baked, the combination of conveyor means for conveying a pan of bread to a depanning station, said conveyor means including a downwardly curved section adjacent to the depanning station for at least partially inverting the pan, a lug movable with the conveyor means about the periphery of said curved section for supporting the pan during at least a part of said inverting movement, means adapted to receive and engage a top portion of the pan during the inverting movement to arrest the pan and jar the bread from the pan, said arresting means permitting the bread to fall by gravity and momentum from the pan, an inclined chute adapted to receive the bread as it falls from the pan, bread re-inverting means interposed between the arresting means and said chute and adapted to intercept the bread as it falls from the pan, turn it about an axis transverse to the conveyor means, and drop it on said inclined chute in righted position, and means for re-inverting the pans after they have discharged their contents at the depanning station.

3. In a depanning device for extracting bread or the like from a plurality of open-topped pans forming a unitary pan set in which the bread is baked, the combination of conveyor means for conveying the pan sets to a depanning station, said conveyor means including a downwardly curved section adjacent to the depanning station for at least partially inverting the pans, a lug movable with the conveyor means about the periphery of said curved section for supporting a pan set during at least a part of said inverting movement, a knock-out bar adapted to receive and engage a top portion of the pan set between adjacent loaves of bread during the inverting movement to arrest the pan set and jar the bread from the pans, said bar permitting the bread to fall by gravity and momentum from the pans, an inclined chute adapted to receive the bread as it falls from the pans, and bread re-inverting means interposed between the knock-out bar and said chute and adapted to intercept the bread as it falls from the pans, turn the bread about an axis transverse to the conveyor means, and drop the bread on said inclined chute in righted position.

4. In a depanning device for extracting bread or the like from a plurality of open-topped pans forming a unitary pan set in which the bread is baked, the combination of conveyor means for conveying the pan sets to a depanning station, said conveyor means including a downwardly curved section adjacent to the depanning station for at least partially inverting the pans, a lug movable with the conveyor means about the periphery of said curved section for supporting a pan set during at least a part of said inverting movement, a knock-out bar adapted to receive and engage a top portion of the pan set between adjacent loaves of bread during the inverting movement to arrest the pan set and jar the bread from the pans, said bar permitting the bread to fall by gravity and momentum from the pans, an inclined chute adapted to receive the bread as it falls from the pans, bread re-inverting means interposed between the knock-out bar and said chute and adapted to intercept the bread as it falls from the pans, turn the bread about an axis transverse to the conveyor means, and drop the bread on said inclined chute in righted position, and means for re-inverting the pan sets after they have discharged their contents at the depanning station.

HILBERT JOHN HARKER.

REFERENCES CITED

The following references are of record in the file of this patent:

UNITED STATES PATENTS

| Number | Name | Date |
|---|---|---|
| 456,336 | Paris | July 21, 1891 |
| 1,295,195 | Parker | Feb. 25, 1919 |
| 1,319,190 | Van Houten | Oct. 21, 1919 |
| 1,452,711 | Schroeder et al. | Apr. 24, 1923 |
| 1,473,996 | McGarry | Nov. 3, 1923 |
| 1,935,891 | Schroeder | Nov. 21, 1933 |
| 2,271,937 | Engels | Feb. 3, 1942 |
| 2,344,664 | Adams | Mar. 21, 1944 |